(12) United States Patent
Chen

(10) Patent No.: US 8,950,691 B2
(45) Date of Patent: Feb. 10, 2015

(54) FOAM GENERATING APPARATUS

(71) Applicants: Yen-An Chen, Keelung (TW); Wei-Tun Chang, Keelung (TW)

(72) Inventor: Yen-An Chen, Keelung (TW)

(73) Assignees: Yen-An Chen, Keelung (TW); Wei-Tun Chang, Keelung (TW)

( * ) Notice: Subject to any disclaimer, the term of this patent is extended or adjusted under 35 U.S.C. 154(b) by 187 days.

(21) Appl. No.: 13/835,767

(22) Filed: Mar. 15, 2013

(65) Prior Publication Data

US 2014/0252130 A1 Sep. 11, 2014

(30) Foreign Application Priority Data

Mar. 5, 2013 (TW) .............................. 102204015 U

(51) Int. Cl.
| | |
|---|---|
| A62C 31/02 | (2006.01) |
| B05B 1/12 | (2006.01) |
| B05B 1/16 | (2006.01) |
| B08B 3/00 | (2006.01) |
| B60S 3/04 | (2006.01) |
| B01F 5/06 | (2006.01) |
| B01F 3/04 | (2006.01) |
| B05B 7/00 | (2006.01) |

(52) U.S. Cl.
CPC ... *B05B 1/12* (2013.01); *B05B 1/16* (2013.01); *B08B 3/003* (2013.01); *B60S 3/04* (2013.01); *B01F 5/0691* (2013.01); *B01F 3/04446* (2013.01); *B05B 7/0018* (2013.01)

USPC .......................................... 239/393; 239/326

(58) Field of Classification Search
CPC .......... B05B 1/169; B05B 1/1645; B05B 1/16
USPC .................. 239/326, 391, 393, 394, 409, 145
See application file for complete search history.

(56) References Cited

U.S. PATENT DOCUMENTS

| | | | | |
|---|---|---|---|---|
| 2,853,727 | A * | 9/1958 | Nadai | 401/202 |
| 2,949,900 | A * | 8/1960 | Bodine | 123/472 |
| 3,393,963 | A * | 7/1968 | Nadai | 401/207 |
| 3,713,586 | A * | 1/1973 | Webster | 239/326 |
| 3,940,024 | A * | 2/1976 | Russo et al. | 222/182 |
| 6,513,735 | B1 * | 2/2003 | Clark | 239/542 |

* cited by examiner

*Primary Examiner* — Davis Hwu
(74) *Attorney, Agent, or Firm* — Rosenberg, Klein & Lee

(57) ABSTRACT

A foam generating apparatus includes a body, a porous body, a cap, a cushion and a switching member. The body includes a holding space and a joint opening connecting the holding space, the water supply line coupled with the joint opening so as to inject a liquid into the holding space; the porous body disposed in the holding space, the porous body foaming the liquid injected into the holding space; the cap disposed jointly on an opening of the holding space, the cap including a spray member, the formed liquid being sprayed out via the spray member; the cushion attached inside the cap and against the porous body so the porous body is disposed fixedly in the holding space; the switching member disposed rotatably on the spray member so a user rotates and changes the way the liquid is sprayed from the spray member.

6 Claims, 4 Drawing Sheets

FOAM GENERATING APPARATUS

This application claims the benefits of the Taiwan Patent Application Serial NO. 102204015 filed on Mar. 5, 2013, the subject matter of which is incorporated herein by reference.

BACKGROUND OF THE INVENTION

1. Field of the Invention

The present invention relates to a foam generating apparatus and more particularly, relates to a foam generating apparatus including a switching member for switching among different spray patterns.

2. Description

Generally, when a user wishes to clean bigger objects such as vehicles or buildings, pipes and nozzles are combines to generate strong waterspouts and the pressure of the strong waterspouts cleans these objects. Although cleaning with pure waterspouts has a certain level of cleaning effect, it has limited effects if there is ingrained dirt on these objects. Thus, nozzles including sponges are utilized for generating and foaming waterspouts for cleansing.

However, although techniques nowadays provide apparatus for water foaming, water can only be sprayed in a form of waterspout and thus various spray patterns are lacked.

SUMMARY OF THE INVENTION

In prior art, water can only be sprayed in a form of waterspout; as a result, various spray patterns are lacked and the efficiency of cleaning is limited.

Therefore, a foam generating apparatus is provided according to embodiments of invention, the foam generating apparatus including a rotatable switching member for switching among different spray patterns.

A foam generating apparatus for a water supply line is provided, the apparatus including a body, a porous body, a cap, a cushion and a switching member. The body includes a holding space and a joint opening connecting the holding space, the water supply line coupled with the joint opening so as to inject a liquid into the holding space; the porous body disposed in the holding space, the porous body foaming the liquid injected into the holding space; the cap disposed jointly on an opening of the holding space, the cap including a spray member, the formed liquid being sprayed out via the spray member; the cushion attached inside the cap and against the porous body so the porous body is disposed fixedly in the holding space; the switching member disposed rotatably on the spray member so a user rotates and changes the way the liquid is sprayed from the spray member. As a result, the foamed liquid can be sprayed in different spray patterns.

According to an embodiment of the present invention, the spray member includes a plurality of spray holes and the switching member includes at least a circular hole and at least a bar hole corresponding to the spray holes, the switching member and is rotated so when a user switches the switching member, at least one of the spray hole connects the circular hole or the bar hole. Hence, foams in a shape of waterspout are sprayed when the spray hole connects the circular hole and foams in a linear shape are sprayed when the spray hole connects the bar hole. Preferably, the spray member further includes a center spray hole and the switching member includes a center hole correspondingly connecting the center spray hole to provide main spout of foam.

According to an embodiment of the present invention, the foam generating apparatus further includes a control ring disposed fixedly around the switching member, the user rotating the control ring to control the rotation of the switching member.

According to an embodiment of the present invention, the cushion includes a concave part disposed correspondingly to the joint opening, the concave part concentrating the pressure of the liquid so the liquid flowing through the porous body efficiently.

According to an embodiment of the present invention, the spray member includes at least a bump and the switching member includes at least a slot disposed corresponding to the bump so the switching member rotates and positions according to a jointing of the bump and the slot and so the bump reminds the user of rotating positions.

BRIEF DESCRIPTION OF THE DRAWINGS

Other features and advantages of this invention will become more apparent in the following detailed description of the preferred embodiments of this invention, with reference to the accompanying drawings

DETAILED DESCRIPTION OF THE PREFERRED EMBODIMENT

The present invention relates to a foam generating apparatus. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
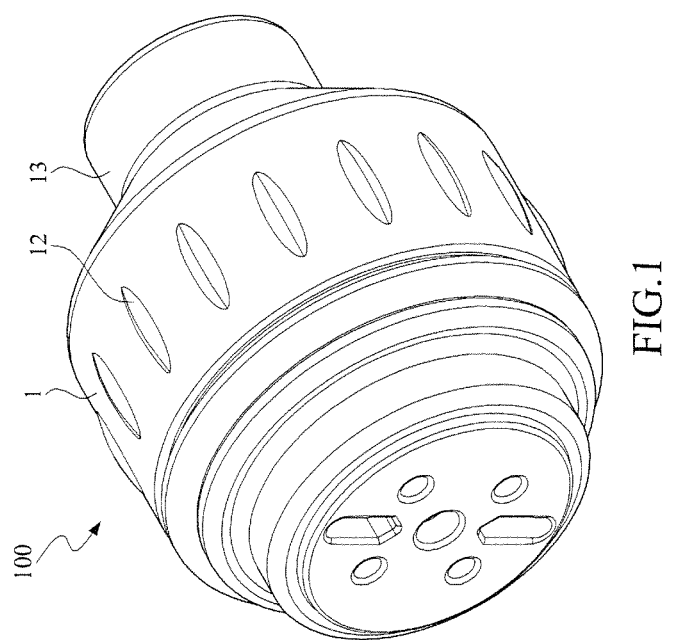
FIG. 1 is a schematic view of a foam generating apparatus according to an embodiment of the present invention.
Figure 2:
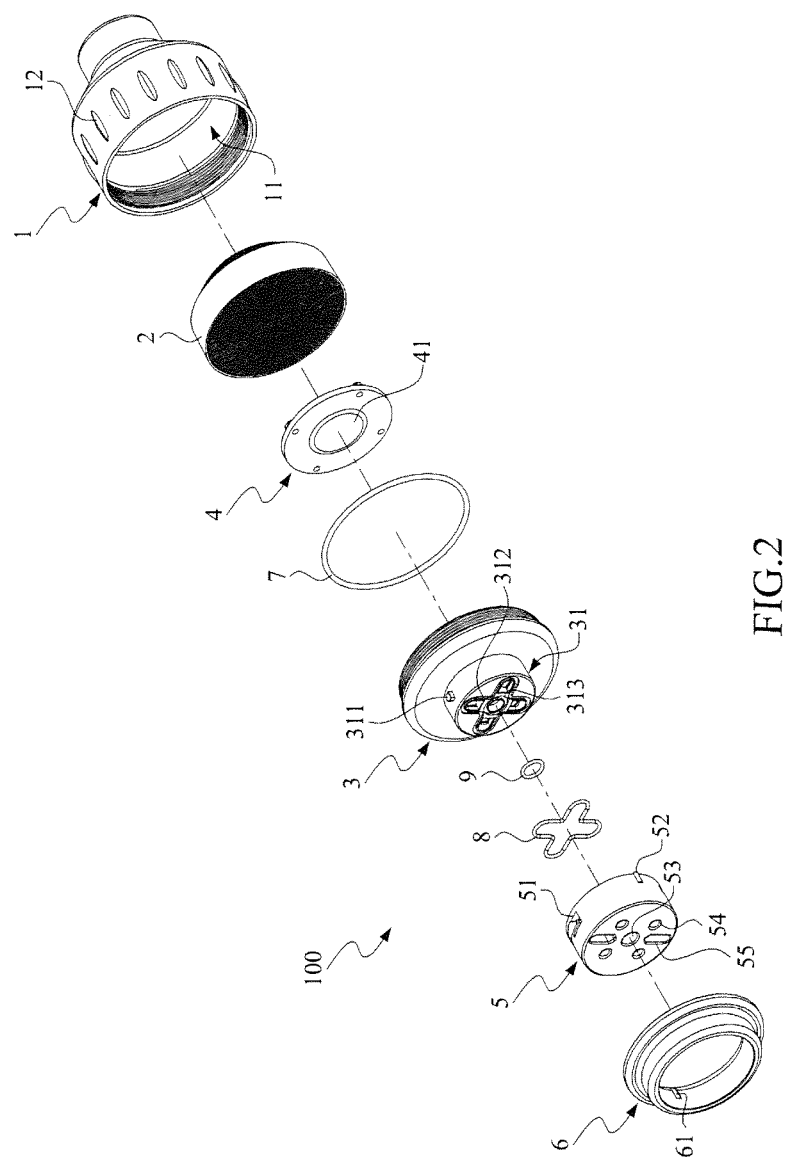
FIG. 2 is a breakdown view of a foam generating apparatus according to an embodiment of the present invention.
Figure 3:
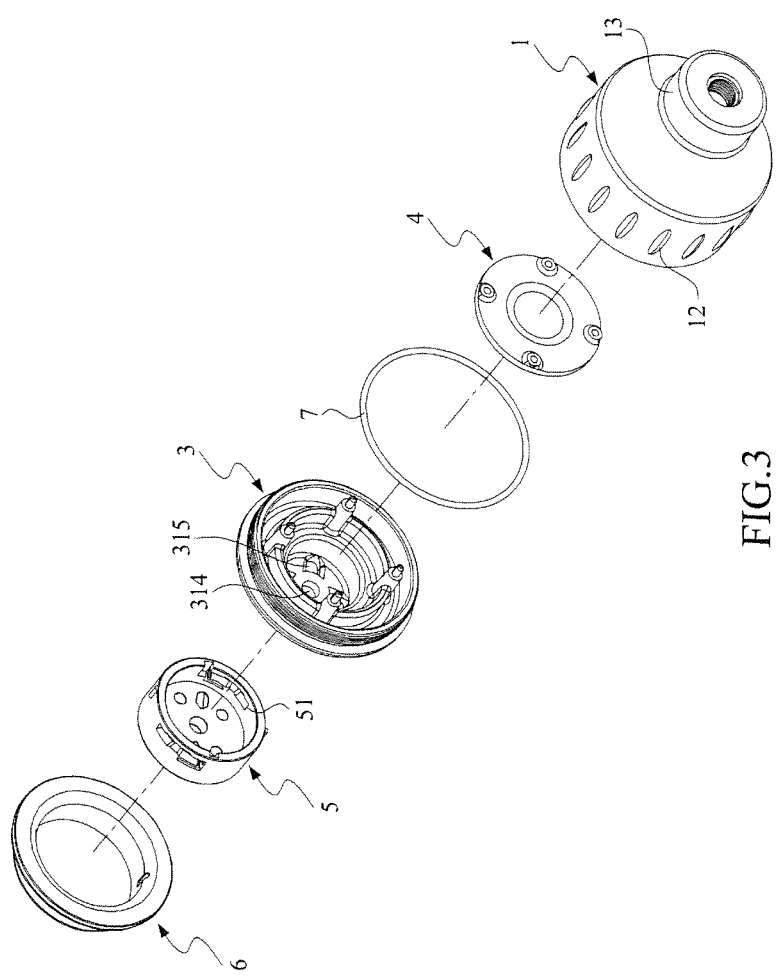
FIG. 3 is a breakdown view of a foam generating apparatus according to an embodiment of the present invention from another angle.
Figure 4:
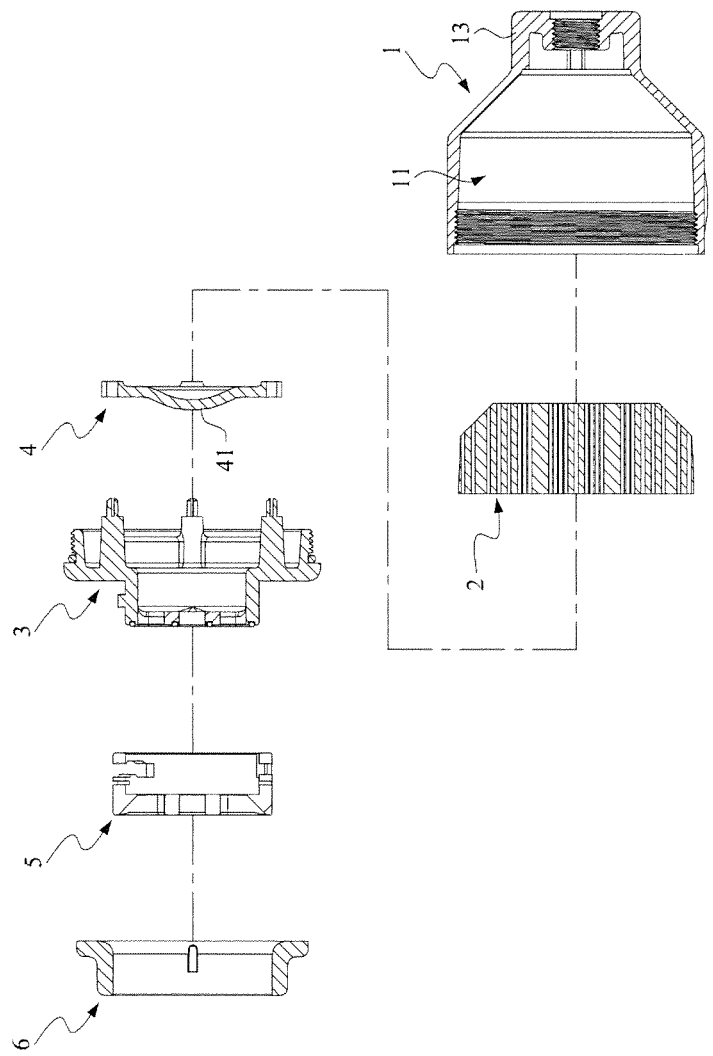
FIG. 4 a cross-sectional and breakdown view of a foam generating apparatus according to an embodiment of the present invention.

Refer to FIG. 1 to FIG. 4; FIG. 1 is a schematic view of a foam generating apparatus according to an embodiment of the present invention; FIG. 2 is a breakdown view of a foam generating apparatus according to the embodiment of the present invention; FIG. 3 is a breakdown view of a foam generating apparatus according to the embodiment of the present invention from another angle; FIG. 4 a cross-sectional and breakdown view of a foam generating apparatus according to the embodiment of the present invention According to the embodiment of the present invention, a foam generating apparatus 100 is provided, the apparatus 100 including a body 1, a porous body 2, a cap 3, a cushion 4, a switching member 5 and a control ring 6. The foam generating apparatus 100 is utilized for a water supply line (not shown); with the foam generation apparatus, a liquid delivered by the water supply line is foamed and sprayed. Practically, the water supply line is connected with the foam generating apparatus 100 via a nozzle. The nozzle controls the water supply line and delivered the liquid to the foam generating apparatus 100. The techniques regarding the water supply line and the nozzle belong to common knowledge and are not described here.

The body 1 includes a holding space 11, a plurality of non-slip bumps 12 and a joint opening 13. The holding space 11 is disposed with the porous body 2. The non-slip bumps 12 are for the user to hold the foam generating apparatus 100 stably. The joint opening 13 connects the holding space 11 and the water supply line is coupled with the joint opening 13 so as to inject a liquid into the holding space 11, wherein since the porous body 12 is disposed in the holding space 11, liquid injected into the holding space 11 is foamed due to the porous body 2. Practically, the porous body 2 includes sponges or other open-cell foams.

The cap 3 is disposed jointly on an opening of the holding space 11 and the cap includes a spray member 31. The spray member 31 includes a cylinder and protruding structure with two bumps 311. A center spray hole 312 and four spray holes 313 are disposed on the spray member 31, the four spray holes 313 are disposed around the center spray hole 312 evenly.

The cushion 4 is attached inside the cap 3. According to an embodiment of the present invention, the cushion is latched to the cap 3 with four supporting poles (not shown) protruding inside the cap 3 so that the cap 3 is against the porous body 2 so the porous body 2 is disposed fixedly in the holding space 11. A channel of liquid will be formed between the holding space 11 and the spray member 31 due to the installation of the cushion 4; as a result, after the liquid delivered by the water supply line enters the holding space 11 from the joint opening 13, the liquid is blocked by the cushion 4 and will not directly flow toward the spray member 31 and thus the porous body 2 is full of liquid and efficiently foams the liquid. Besides, the cushion 4 further includes a concave part 41 disposed correspondingly to the joint opening 14, the concave part 41 concentrating the pressure of the liquid entering the holding space 11 so the liquid flows and is foamed through the porous body 2 efficiently.

The switching member 5 includes two slots 51, a center circular hole 53, four circular hole 54 and two bar holes 55. The switching member 5 further includes two fasteners 52. The slots 51 are disposed corresponding to the bumps 311 so the switching member 5 rotates and positions on the spray member 41 for the user to rotate the switching member 5 and to switch the spray patterns of the foam sprayed from the spray member 31. The center circular hole 53 corresponds to the center spray hole 312; the four circular holes 54 are disposed around the center circular hole 53; the two bar holes 55 are disposed symmetrically across the center circular hole 53; the circular holes 54 and the bar holes 55 all correspond to the spray holes 313. That is, the circular holes 54, the bar holes 55 and the spray holes 313 are all on the same route of rotation so that the user rotates the switching member 5 along with the slots 51 to connect the spray holes 313 with the circular holes 54 or the bar holes 55. Besides, the bar holes 55 include a perforating structure in a bar shape with two round ends.

The control ring 6 includes two fastener slots 61 disposed corresponding to the fasteners 52 so the control ring 6 is disposed fixedly around the switching member 5 for the user to rotate the control ring 6 to control the rotation of the switching member 5 and further switch the spray holes 313 to connect with one of the four circular holes 54 or the two bar holes 55.

A sealing ring 7 is disposed between the cap 3 and the body 1, the sealing ring 7 preventing the liquid from effusing from the holding space 11. A cross gasket 8 and a circular gasket 9 are disposed between the spray member 31 and the switching member 5 so the center spray hole 312 and the spray holes 313 are independent and not mutually connected.

In conclusion, according to embodiments of the present invention, the porous body is disposed inside the holding space and when the cap is coupled with the body, the cushion is utilized to fix the porous body; the channel is formed in the holding space with the cushion; the liquid entering from the joint opening is blocked by the cushion and flows toward its surroundings; since the porous body is attached to the cushion, the liquid will fulfill the porous body so that the amount of foams is increased. Besides, since the switching member includes the bar hole and the circular hole, when the user rotates the switching member to connect the bar hole or the circular hole with its corresponding spray hole, the shape of the liquid sprayed from the spray hole varies accordingly for the user's need.

While the present invention has been particularly shown and described with reference to a preferred embodiment, it will be understood by those skilled in the art that various changes in form and detail may be without departing from the spirit and scope of the present invention.

What is claimed is:

1. A foam generating apparatus for a water supply line, the apparatus comprising:
    a body including a holding space and a joint opening connecting the holding space, the water supply line coupled with the joint opening so as to inject a liquid into the holding space;
    a porous body disposed in the holding space, the porous body foaming the liquid injected into the holding space;
    a cap disposed jointly on an opening of the holding space, the cap including a spray member, the formed liquid being sprayed out via the spray member;
    a cushion attached inside the cap and against the porous body so the porous body is disposed fixedly in the holding space; and
    a switching member disposed rotatably on the spray member so a user rotates and changes the way the liquid is sprayed from the spray member.

2. The foam generating apparatus according to claim 1, wherein the spray member includes a plurality of spray holes and the switching member includes at least a circular hole and at least a bar hole corresponding to the spray holes, the switching member and is rotated so at least one of the spray hole connects the circular hole or the bar hole.

3. The foam generating apparatus according to claim 2, wherein the spray member further includes a center spray hole and the switching member includes a center hole correspondingly connecting the center spray hole.

4. The foam generating apparatus according to claim 1, further comprising a control ring disposed fixedly around the switching member, the user rotating the control ring to control the rotation of the switching member.

5. The foam generating apparatus according to claim 1, wherein the cushion includes a concave part disposed correspondingly to the joint opening, the concave part concentrating the pressure of the liquid.

6. The foam generating apparatus according to claim 1, wherein the spray member includes at least a bump and the switching member includes at least a slot disposed corresponding to the bump so the switching member rotates and positions according to a jointing of the bump and the slot.

* * * * *